W. PIERPONT.
Thrashing Machine.
No. 33,049.
Patented July 13, 1861.
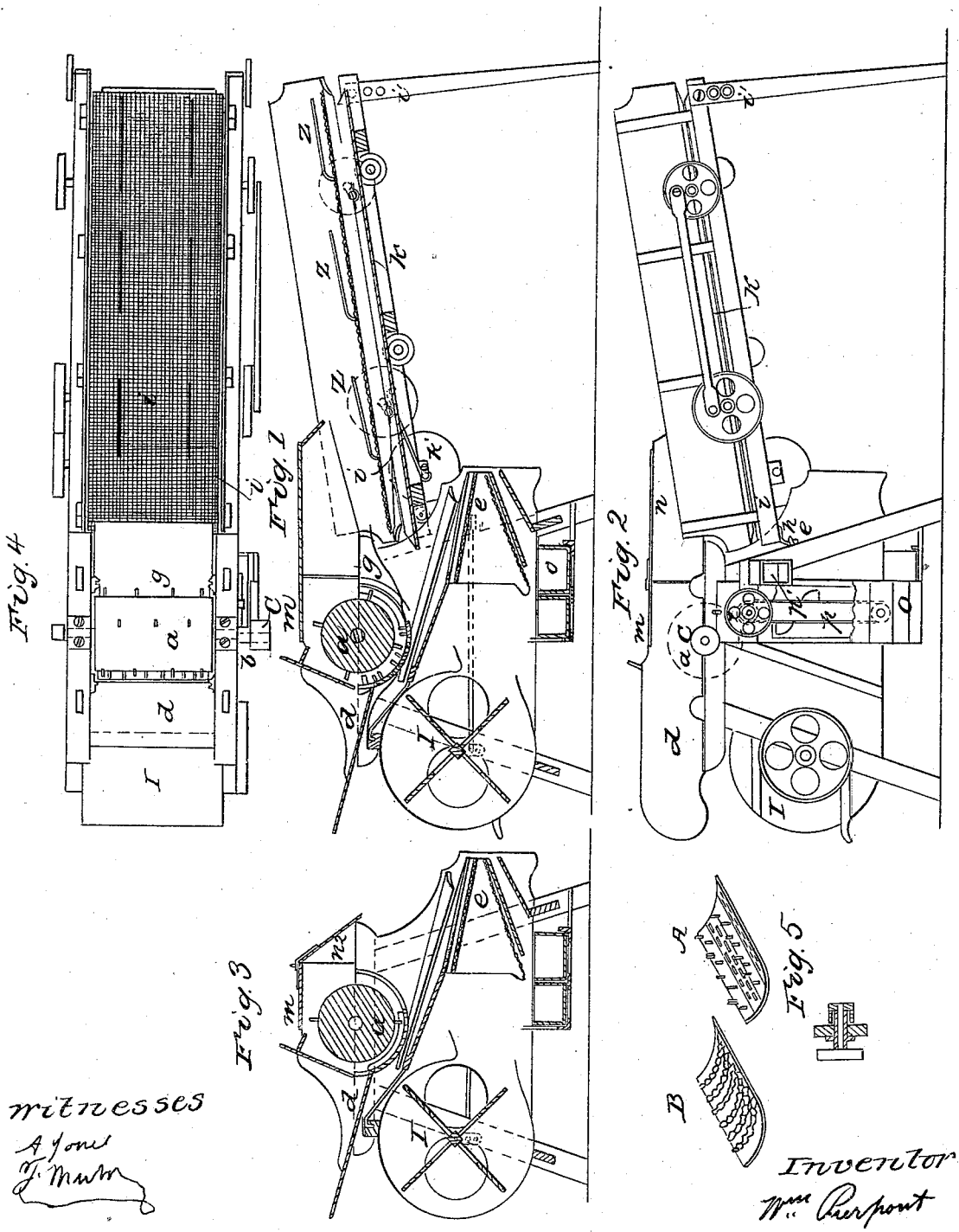

UNITED STATES PATENT OFFICE.

WILLIAM PIERPOINT, OF SALEM, NEW JERSEY.

THRESHER AND CLEANER OF GRAIN.

Specification of Letters Patent No. 33,049, dated August 13, 1861.

*To all whom it may concern:*

Be it known that I, WM. PIERPOINT, of Salem, in the county of Salem and State of New Jersey, have invented certain new and useful improvements in combining machinery for the purposes of threshing and cleaning grain, cleaning clover-seed, and for all general purposes of separating seeds from the straw, chaff, &c.; and I do hereby declare and ascertain my said invention and its modifications in the drawings.

Figure 1. is a longitudinal vertical section through the machine arranged for a grain thresher with the separator &c. affixed. Fig. 2. is a similar elevation side view. Fig. 3. is a sectional elevation arranged with the hulling apparatus B. hulling concave. Fig. 4. is a plan of Fig. 1. Fig. 5. details of construction of elevator section of box and pulleys.

My improvements relate principally to the construction arrangement and adaptation of parts so as to readily fit a simple implement for the several purposes of getting out and cleaning the great varieties of seed harvested by the agriculturist. At present there is no machine adapted to getting out the heavier grains such as wheat, barley &c. the lighter such as oats and the grass seeds, consequently the farmer is obliged to purchase several machines each adapted to but one purpose.

The construction of my machine for threshing and cleaning wheat is as follows: I make a stout frame composed of four legs or corner posts which stand bracing inclining inward, at the top these posts are connected by proper cross ties. At the upper part of this frame work there is a concave consisting of sections of iron casting as more clearly represented detached at A. where it will be seen to have openings through for the escape of the grain the upper or concave surface is armed with spikes or projecting pins the front row of which are made with knife edges so that the straw in coming into contact with them will be cut—thus relieving the power from breaking and tearing the tangled straw as in other machines as clearly indicated in the drawing. Into this concave (which is slid into permanent grooves affixed to the frame) a cylinder $a$ runs, this cylinder has proper journal boxes in the frame of common form in which its journals run and it is studded with radial pins so arranged as to pass between the pins on the concave. On the right hand end of the journal of the cylinder there is a small pulley $b$ by which the face hereafter described is driven and outside of this is the driving pulley $c$ which receives its motion from the driving power. The inner pulley is made to change for different sizes as hereafter explained by taking off the driving pulley $c$ and changing the inner one for one larger or smaller. Under the hopper or platform $d$ over which the grain is fed to the threshing cylinder $a$ there is an inclosed fan $i$ of the most approved ordinary construction and of large size the rapidity of the revolutions of which are determined by the size of the pulley $b$ before named.

In front of the fan and cylinder the screens or sieves $e$ are placed vibrated as is usual for screening purposes and the straw as it leaves the cylinder is elevated before it is thrown upon the straw carrier and separator to be described, by means of a curved plate or board $g$ which extends out from the concave and as it is thrown out it is caught by the hood hereafter described. This is very important to keep the working parts clear and the straw from lodging which would otherwise take place if the conveyer $g$ is inclined downward, where the hood $n$ is used to stop the straw and prevent its being driven off without being acted upon by the entire conveyer. There are staples at $h$ in the posts next the straw carrier $i$ into which hooks on the inner end of said carrier frame catch to support that end of the frame and at the same time allow it to be readily detached the outer end of said frames is supported by legs $i'$ that are adjustable to regulate its height.

The straw carrier is like that already patented by me, dated May 7, 1850, with the following additions and improvements—a flat board $k$ having elevated sides is placed on rollers in the frame below the screen or carrier and extending its whole length—this board receives a longitudinal motion by being connected by pitmen with sunk cranks on shaft $k'$ this catches all the grain separated from the straw and conveys it back to the screens where it is screened with the rest of the threshed grain that has fallen from the concave.

Upon the separator I fasten a series of bent rods or bars $z$, the form and position are seen in Fig. 1, there are useful and important aids in shaking and clearing the straw from the grain on this especial plan of separating.

The cylinder is covered with a cap $m$ unto which an extension hood $n$ is hooked that extends out over the straw carrier and effectually prevents the escape of the straw and grain, which is thrown by it down on the end of the carrier next to and just under the guide $g$ which thus causes the straw to be shaken the whole length of the carrier instead of being driven forward to the middle thereof as would otherwise be the case.

The operation is as follows: The machine being put in motion the bundles of grain are fed in over the board $a$ and caught by the revolving cylinder $a$ and threshed between it and the concave the grain as it is liberated, falling through the openings or holes in the concave, thence the straw is driven through under the cylinder and up the guide plate $g$ by which it is kept within the influence of the cylinder until thrown completely out of the machine unto the separator $i$ where it is shaken and conveyed off, depositing all the loose grain that has been caught and carried forward by the straw upon the board $k$ below.

The grain falls from the screens into a conductor and thence into a receptacle on one side at $o$ Fig. 2 from which it is raised by an elevator $p$. into a spout $p'$. from which it is bagged. The elevator receives its motion from the fan as clearly indicated by the cross band in Fig. 2. The shafts, the pulleys, of the elevator, are supported in long boxes (see Fig. 5.) which run into the center of the elevator band pulley this obviates a necessity of a bearing on the other end and prevents the clogging of the elevator. The machine thus rigged will thresh all kinds of grain, the blast being regulated according to the kind of grain threshed.

For threshing clover seed the concave is removed and in place thereof another concave such as is represented at B. is substituted this concave is not pierced with holes and instead of the pins or spikes there is a series of waved or zig zag ribs running along around the breadth of the concave the ribs fill the span sufficiently to effect the purpose of separating the grass seed with the same cylinder as was before used for threshing grain, thus rendering the employment of the same apparatus practicable for both purposes. The straw carrier is removed together with the hood $n$ and the elevating plate $g$ and the hood is replaced by a short hood or guard $n^2$ seen in Fig. 3. Thus arranged the apparatus is transposed into a grass seed huller.

Having thus fully described my improved grain and grass seed thresher and cleaner what I claim therein as new for which I desire to secure Leters Patent is—

In combination with an endless band elevator for grain, pulleys as herein described having a long outside bearing for the shaft and no inner bearing for the shaft as herein fully set forth.

WM. PIERPOINT.

Witnesses:
 H. B. WARE,
 O. B. STOUGHTON.